United States Patent [19]
Umeda et al.

[11] Patent Number: 4,712,876
[45] Date of Patent: Dec. 15, 1987

[54] DRIVING FERROELECTRIC LIQUID CRYSTAL PRINTERS VIA SHORT CIRCUITING

[75] Inventors: Takao Umeda, Mito; Kazuya Ooishi, Toukai; Tatsuo Igawa, Kitaibaraki; Yasuro Hori, Katsuta, all of Japan

[73] Assignee: Hitachi, Ltd., Tokyo, Japan

[21] Appl. No.: 751,847

[22] Filed: Jul. 5, 1985

[30] Foreign Application Priority Data
Jul. 4, 1984 [JP] Japan .................. 59-138786

[51] Int. Cl.⁴ .............................................. G02F 1/137
[52] U.S. Cl. ............................ 350/350 S; 340/784; 353/3
[58] Field of Search ............... 350/339 R, 341, 332, 350/350 S; 340/784, 765, 805; 353/3 R

[56] References Cited
U.S. PATENT DOCUMENTS

| 3,868,674 | 2/1975 | Lorteise | 350/332 X |
| 3,961,840 | 6/1976 | Morokawa et al. | 350/332 |
| 4,051,465 | 9/1977 | Body | 340/784 X |
| 4,429,305 | 1/1984 | Hosokawa et al. | 340/784 |
| 4,440,473 | 4/1984 | Sekimoto | 350/332 X |
| 4,508,429 | 4/1985 | Nagae et al. | 350/332 X |
| 4,548,476 | 10/1985 | Kaneko | 350/350 S |

Primary Examiner—Stanley D. Miller
Assistant Examiner—David Lewis
Attorney, Agent, or Firm—Antonelli, Terry & Wands

[57] ABSTRACT

In a driving method of an optical switch element for controlling a quantity of transmission light between opposed electrodes by interposing a transparent, high dielectric material between the opposed electrodes and applying a positive or negative voltage between the opposed electrodes, the improvement wherein a period in which the opposed electrodes are substantially short-circuited is disposed in order to make it possible to either reduce or eliminate stored charge.

2 Claims, 21 Drawing Figures

PRINTING DIRECTION (a)

(b)

(c)

(d)

(e)

DRIVING FERROELECTRIC LIQUID CRYSTAL PRINTERS VIA SHORT CIRCUITING

BACKGROUND OF THE INVENTION

This invention relates to a method of driving optical switch elements using a transparent high dielectric material, which is used for a printing portion of a printer of a duplicating machine, a printing portion of a facsimile, or for a display.

An optical switch element using transparent ceramics (PLZT) is well known as an optical switch element using a high dielectric material.

On the other hand, an optical switch element using a chiral smectic liquid crystal as a high dielectric material has recently drawn increasing attention, and hence this switch element will be described. Chiral smectic C and H liquid crystal materials, for example, inherently have a ferroelectric property. In the present specification, the term "high dielectric material" has been used to refer to ferroelectric liquid crystal materials.

In order to clarify the chiral smectic liquid crystal, Table 1 tabulates chemical structures and phase transition points of chiral smectic C liquid crystal SmC (DOBAMBC, OOBAMBCC) and chiral smectic H liquid crystal SmH (HOBACPC).

tained by utilizing the d.c. field response of the liquid crystal molecules 2.

FIG. 11 shows the structure and principle of operation of a birefringence type optical switch element which transmits and cuts off the light by utilizing the birefringence of the liquid crystal molecules 2. As shown in FIG. 11(a), the birefringence type optical switch element has a structure in which a liquid crystal layer 4 is interposed between, and in parallel with, glass substrates 5a and 5b equipped on the surface thereof a pair of transparent opposed electrodes 6a, 6b, respectively, and two polarization plates 7a and 7b are disposed on both sides of the substrates 5a and 5b in such a fashion that their axes of polarization cross at right angles. In this case, if the axis of polarization of the polarization plate 7a is set to be at an angle $\theta$ to the spiral axis 1 as shown in FIG. 11(b), the orientation direction of the liquid crystal molecules 2 is in agreement with the axis of polarization of the polarization plate 7a when a negative electric field $|E| < |E_c|$ is applied, as shown in FIG. 11(d). Therefore, the light 9 incident into the optical switch element from the light source 8 does not pass therethrough but is cut off. When a positive d.c. field $(E > E_c)$ is applied, on the contrary, the orientation direction of the liquid crystal molecules 2 is deviated from the axis of polarization as shown in

TABLE 1

| chemical structure, name (common name) | phase transition point |
|---|---|
| $C_{10}H_{21}$—O—〈O〉—CH=N—〈O〉—CH=CH—C(=O)—O—CH$_2$—*CH(CH$_3$)—C$_2$H$_5$<br>P—decyloxy benzylidene P'—amino 2 methyl butyl cinnamate (DOBAMBC) | 76° C. 95° C. 117° C.<br>Cryst. →SmC* →SmA →Iso.<br>↘ ↗ 63° C.<br>SmH* |
| $C_8H_{17}$—O—〈O〉—CH=N—〈O〉—CH=C(Cl)—C(=O)—O—CH$_2$—*CH(CH)—C$_2$H$_5$<br>P—octyloxy benzylidene P'—amino 2 methyl butyl α chloro cinnamate (OOBAMBCC) | 41° C. 66° C.<br>Cryst. →SmA →Iso.<br>27° C. ↘ ↗ 38° C.<br>SmC* |
| $C_6H_{13}$—O—〈O〉—CH=N—〈O〉—CH=CH—C(=O)—O—CH$_2$—*C(H)(Cl)—CH$_3$<br>P—hexyloxy benzylindene P'—amino 2 chloro α propyle cinnamate (HOBACPC) | 60° C. 64° C. 78° C. 135° C.<br>Cryst. →SmH* →SmC* →SmA →Iso. |

Next, FIG. 10 shows the electrolytic response of these chiral smectic liquid crystal molecules (which will be hereinafter called the "liquid crystal molecules" unless specified otherwise). As shown in FIG. 10, the liquid crystal molecules 2 have a so-called "twist structure" around a spiral axis 1 under the state in which an electric field is not applied (E=0). When an electric field E exceeding a critical electric field $E_c$, which is determined by the properties of the liquid crystal (such as spontaneous polarization, twist viscosity), is applied to the liquid crystal molecules from an orthogonal direction with respect to the spiral axis 1, the liquid crystal molecules are arranged in such a fashion that the direction of the spontaneous polarization is in agreement with the direction of the field E. Therefore, the liquid crystal molecules are uniformly arranged at an angle $\theta$ with respect to the spiral axis 1 (the angle $\theta$ representing the twist angle of the liquid crystal molecules 2; hereinafter called a "tilt angle") as shown in FIGS. 10(a) and 10(c). An optical shutter element capable of transmitting and cutting off the light can be ob- FIG. 11(c), so that the light passes due to the birefringence effect. In this manner, the optical switching action is attained by reversing the polarity of the d.c. field E, and its response is as fast as from several dozens of $\mu$s to several milli-seconds.

If the liquid crystal is used, the thickness of the liquid crystal layer 4 can be reduced to about several $\mu$m, and the liquid crystal can be driven at a low voltage of about 10 to about 20 V. In the case of transparent ceramics (PLZT), on the other hand, a voltage as high as about several hundreds of volts is necessary. Hence, the liquid crystal device can be driven at a far lower voltage.

FIG. 12 shows the structure and operation principle of a guest-host type optical switch element for controlling the light transmission quantity by mixing a dichroic pigment into the liquid crystal layer. In the guest-host type element, a dichroic pigment such as a black pigment is placed into the liquid crystal layer. In this case, only one polarization plate is used. The axis of polarization of the polarization plate 7a is arranged as shown in FIG. 12(b). When a negative d.c. voltage ($|E| < |E_c|$)

is applied as shown in FIG. 12(d), the dichroic pigment assumes the same orientation state as that of the liquid crystal molecules 2, so that the axis of absorption of the dichroic pigment molecules 10 (the major axis of the molecules) is in agreement with the axis of polarization of the polarization plate, and the light 9 incident into the liquid crystal layer 4 is absorbed. Therefore, the light does not pass but is substantially cut off. When a positive voltage ($E > E_c$) is applied, on the contrary, the orientation direction of the dichroic pigment molecules 10 is deviated from the axis of polarization, so that the light is not absorbed but passes through the optical switch element. In this manner, the guest-host type optical switch element can switch the light by inverting the polarity of the d.c. field E, in the same way as the birefringence type optical switch element (FIG. 11). The element of this type can respond at a high speed by a low voltage in the same way as the birefringence type element.

The optical switch elements using high dielectric materials including the high dielectric liquid crystal are driven by applying thereto a d.c. voltage (field). It has been found, however, that various problems occur in this case due to non-uniform existance of ions. FIG. 13 shows the internal state of the element when a positive d.c. voltage $+V_o$ is applied to the high dielectric liquid crystal element. Since the liquid crystal molecules 2 have the spontaneous polarization P, they are arranged so that the direction of the spontaneous polarization P is in parallel with the field E due to the voltage $+V_o$ applied from outside. The magnitude of the spontaneous polarization is several coulombs (nc)/cm² to several dozens of coulombs (nc)/cm².

On the other hand, since liquid crystal materials are synthesized, they contain greater amounts of conductive impurities than solid high dielectric materials, and since a high electric field is applied, unstable material compositions are likely to dissociate. Therefore, as shown in FIG. 13(a), those ionic materials which have a negative charge gather close to the orientation film 11a on the side of the positive electrode, and those which have a positive charge gather close to the orientation film 11b on the side of the negative electrode, respectively. Such non-uniform existence of ions increases with a longer application time, and finally gets into saturation (FIG. 13(b)).

FIG. 14 shows the change of a potential distribution state due to the non-uniform existence of ions. The axis of abscissa represents a distance measured from the electrode 6a to which the positive voltage is applied, $l_a$ is a thickness of the orientation film 11a and ($l-l_b$) is a thickness of the orientation film 11b. The thickness of the orientation films are from several hundreds of angstroms to thousand angstroms (Å), and the thickness of the liquid crystal layer is several microns (μm). When the ionic materials do not exist inside the liquid crystal layer, a potential distribution becomes uniform as represented by a line A, but when non-uniform existence of ions starts occurring as shown in FIG. 13(a), a potential distribution becomes such as B in FIG. 14. As the non-uniformity further proceeds as shown in FIG. 13(b), a potential distribution becomes such as C in FIG. 14. As can be seen from the diagram, non-uniform existence of ions makes the voltage applied to the orientation films higher and makes it more difficult to apply the voltage to the liquid crystal layer. FIG. 15 illustrates the behaviour. As a result, it has been found that the following two problems occur.

First of all, when the voltage applied to the liquid crystal layer drops and when a voltage of the same polarity is continuously applied for a long period, this voltage becomes smaller than the critical voltage $V_c$, whereby the orientation of the liquid crystal molecules is disturbed and contrast drops (or the performance of the optical switch drops).

Second, the voltage applied to the orientation films increases and an impressed electric field becomes as high as MV/cm. (When non-uniformity of ions does not exist, it is some dozens of KV/cm.) The orientation films are generally organic films, and particularly in the case of films formed by spinner or printing, a large number of pin-holes exist so that the films undergo dielectric breakdown in a high electric field of MV/cm. As a result, the electrode surface comes into direct contact with the liquid crystal at the portions where dielectric breakdown occurs, so that decomposition and degradation of the liquid crystal materials due to the electrochemical reaction proceed. (This means the degradation of the optical switch element.) For the reasons described above, it is necessary to eliminate the non-uniform existence of ions inside the optical switch element which uses a high dielectric liquid crystal (materials).

Though not a method of preventing the non-uniform existence of ions, a driving method is known (European Patent Application: Publication No. 92181) which applies a pulse voltage which prevents the degradation of the high dielectric liquid crystal and determines the desired light transmission state to the liquid crystal element in a predetermined period, and which also applies a voltage signal which makes zero the mean value of the voltages applied in the predetermined period. Though capable of accomplishing the intended objects, this method can not be used as an essential solution method of eliminating the non-uniformity of ions because the voltage which makes the mean value zero is a positive and negative a.c. voltage so that the non-uniformity of ions can exist even when voltage inversion of one cycle is effected.

SUMMARY OF THE INVENTION

In a driving method of an optical switch element using a high dielectric material, the present invention is directed to provide a method of driving an optical switching element which prevents the drop of the performance of an optical switch and the degradation of the optical switch element by either reducing the length of the period of the non-uniform existence of ions at the time of application of a d.c. voltage to a limited period or reducing the quantity of non-uniform existence of ions.

In order to accomplish the object described above, in a driving method of an optical switch element for controlling a quantity of transmission light between opposed electrodes, which method comprises interposing a high dielectric material between the opposed electrodes and applying a positive or negative voltage between the opposed electrodes, the present invention is characterized in that periods for substantially short-circuiting the opposed electrode are provided.

DESCRIPTION OF THE PREFERRED EMBODIMENTS

Embodiments of driving methods of optical switch element in accordance with the present invention will be described with reference to the accompanying drawings.

Figure 1:
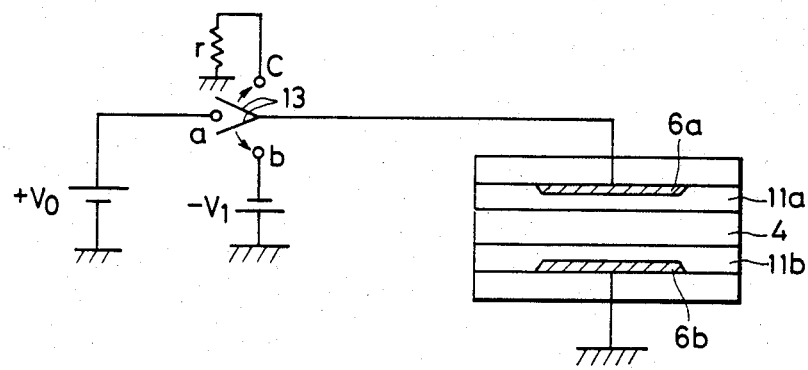
FIG. 1 is a circuit diagram showing the outline of the present invention.

First of all, the present invention will be summarized. FIG. 1 is a view showing an essential point of the present invention. The following two methods can be used, in principle, in order to eliminate non-uniform existence of ions.

(1) A discharge method which inverts the direction of an electric field between opposed electrodes (by changing over a switch 13 from a terminal a to a terminal b) within a short period so as to compulsively cause the migration of ions.

(2) A short-circuit method which short-circuits the opposed electrodes either directly or via a resistor (by changing the switch 13 from the terminal a to c).

Figure 2:
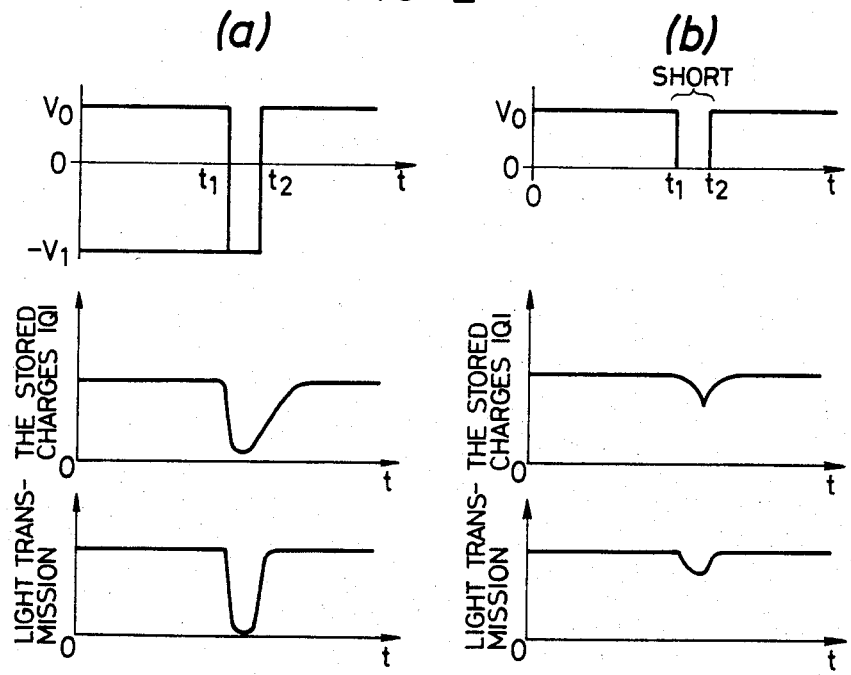
FIG. 2 is a characteristic diagram showing the light transmission characterics in a method of preventing the non-uniform existence of ions.

These two methods have the respective characterizing features, which will now be explained with reference to FIG. 2.

FIG. 2(a) shows the light transmission characteristics when the method (1) is used, and FIG. 2(b) shows the light transmission characteristics when the method (2) is used. Since the first method applies a reverse voltage, non-uniform existence of ions can be eliminated within an extremely short period of time with ($t_2-t_1$) being up to 1 ms. However, the light transmission state inverts within this period, and if this period is elongated, non-uniform existence of opposite ions occurs. Therefore, the period must be shortened.

In accordance with the second short-circuit method, on the other hand, the moving speed of ions greatly depends upon the internal impedance of the element and is extremely slower than the speed in the first method. Therefore, several seconds of time is necessary before the non-uniform existence of ions is completely eliminated, but unlike the discharge method using the polarity inversion, this method does not involve the problem that the non-uniform existence of opposite ions occurs even when the short-circuit state is held for an extended period. If a period in which the non-uniform exitence of ions is compensated for is long such as when the device is not operated (out of operation), the short-circuit method can be employed advantageously. The relation between the impressed voltage to high dielectric liquid crystals which do not assume a completely bistable state such as shown in FIGS. 2(a) and 2(b) and the light transmission quantity is illustrated in FIG. 16.

The object of the present invention can be accomplished by selectively and suitably using these methods in accordance with the intended applications of the optical switch element.

Figure 16:
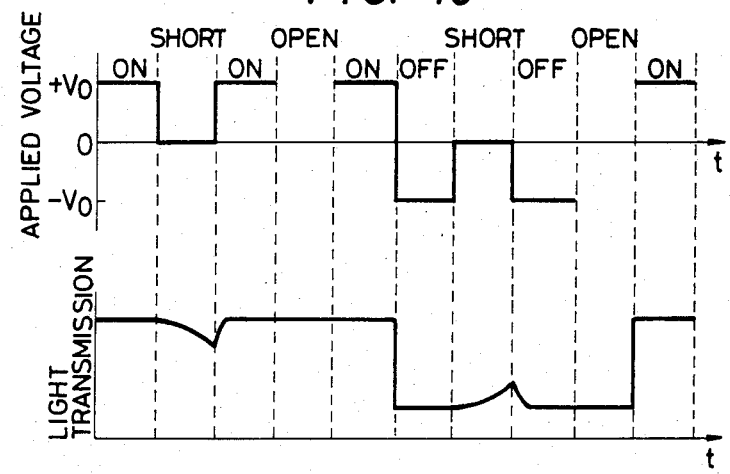
FIG. 16 is a characteristic diagram showing the relation between an impressed voltage to a high dielectric liquid crystal which is used in the embodiments of the invention but does not assume a completely bistable state and a light transmission quantity.
Figure 17:
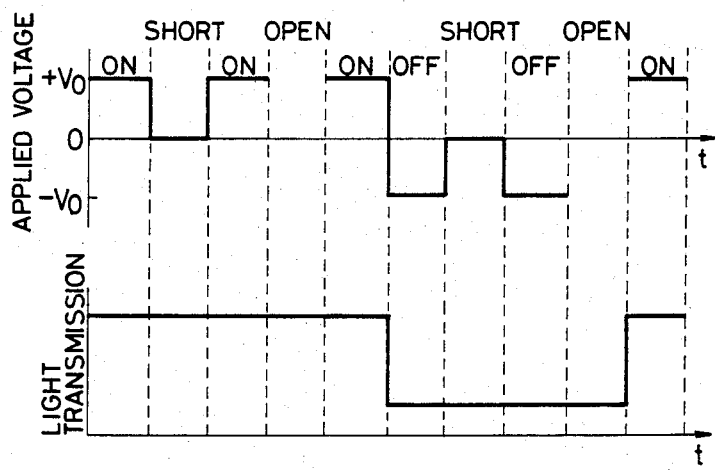
FIG. 17 is a characteristic diagram showing the relation between an impressed voltage to a high dielectric liquid crystal which is used in the embodiments of the invention and assumes a completely bistable state and a light transmission quantity.

The object of the present invention can also be accomplished by use of those high dielectric liquid crystals which assume a completely bistable state such as shown in FIG. 17, besides the high dielectric liquid crystals which do not assume a completely bistable state such as shown in FIG. 2(a), 2(b) and FIG. 16.

Next, some definite embodiments of the present invention will be explained with reference to a printer using the optical switch element. Incidentally, it is obvious for those skilled in the art that the present invention can be applied not only to the printer but also to optical shutters, displays, and so forth.

Figure 3:
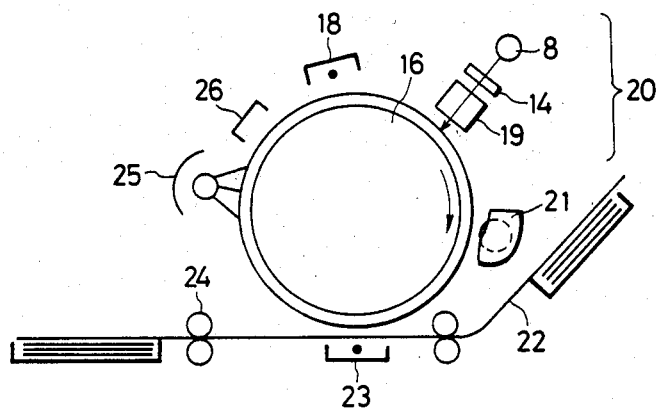
FIG. 3 is a structural view showing a printer.

In FIG. 3, reference numeral 16 represents a photosensitive drum; 18 is a charger; 14 is a liquid crystal optical switch array panel; 19 is an optical image formation element; 20 is an optical write-in portion; 21 is a developer; 22 is paper; 23 is a transfer device; 24 is a fixing device; 25 is an erase lamp; and 26 is a cleaner.

The action of the printer described above will now be explained. The photosensitive drum 16 is provided with uniform electrostatic charge by corona discharge of the charger 18. When light is selectively radiated to this drum 16 by the optical write-in portion consisting of the light source 8, the liquid crystal optical switch array panel 14 and the optical image formation element 19, only the electrostatic charge of the zone to which the light is radiated is extinguished depending upon the properties of a photosensitive member, thereby forming an electrostatic latent image.

Next, a toner having an electric polarity is deposited onto the surface of the photosensitive member by the developer 21, and the electrostatic latent image is made visible. As the paper 22 fed from a cassette is sent to the transfer device 23, the toner image is transferred to the paper by the force of an electric field, and the toner image is further fixed to the paper by a pressure or heat from the fixing device 24, forming a permanent image.

Any residual charge and surface charge on the surface of the photosensitive drum 16 are removed by the erase lamp 25 and the cleaner 26, and the photosensitive member returns to its initial state.

Figure 4:
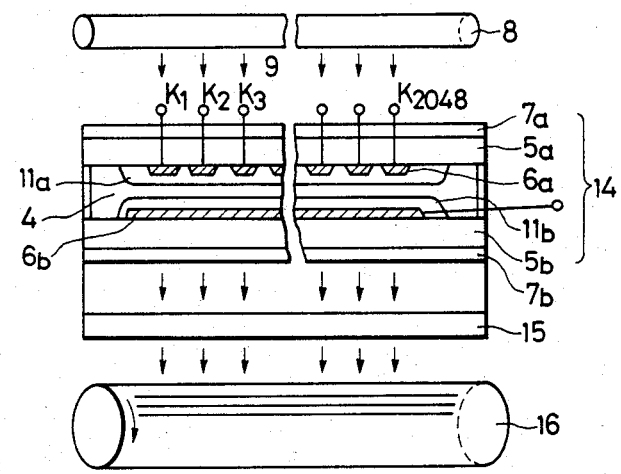
FIG. 4 is a structural view showing the structure of an optical switch array in a printer in accordance with an embodiment of the present invention.
Figure 5:
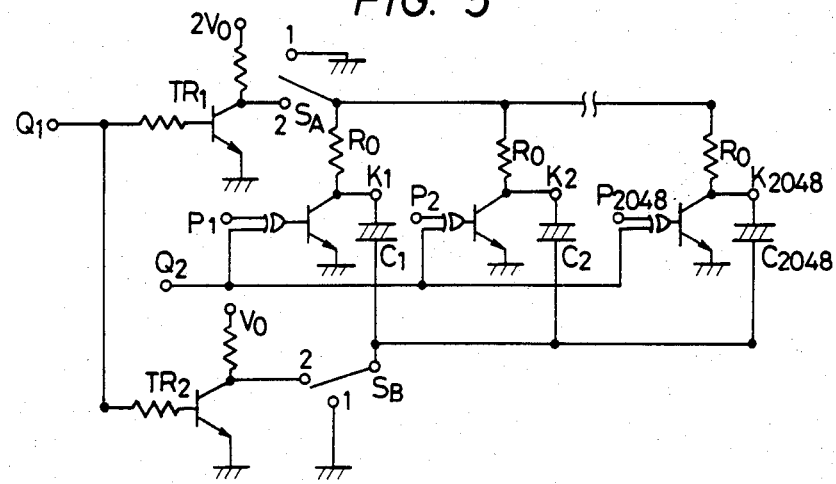
FIG. 5 is a circuit diagram showing a driving circuit of the optical switch array.

Next, FIG. 4 shows the structure of an optical switch element for a printer, which element uses a high dielectric liquid crystal material, and FIG. 5 shows a driving circuit of the present invention. Orientation films 11a and 11b are formed on a fine signal electrode substrate 5a on which electrodes 6a for fine signals are formed (10 electrodes/mm and 2,048 electrodes in all), and on a common electrode substrate 5b on which a common electrode 6b is formed, respectively. An optical switch portion is disposed either two-dimensionally or in a two-dimensional array form, and the DOBAMBC liquid crystal shown in Table 1 is then interposed in parallel between the substrates in a predetermined thickness (about 4 μm). The light 9 incident to the optical switch element 14 from the light source 8 is selectively passed through by an electric field applied between the signal electrode terminal $K_1$–$K_{2048}$ of each electrode and the common electrode 6b, and is spot-radiated onto the surface of the photosensitive drum 16 by the convergent lens 15. In FIG. 5, switches $S_A$ and $S_B$ are main switches for a voltage source to be applied between the group of signal electrodes 6a and the common electrode 6b, and terminals $P_1$–$P_{2048}$ are signal input terminals for controlling the optical switch element portions. Symbol $Q_1$ represents a signal terminal which constitutes one of the characterizing features of the present invention and short-circuits the opposed electrodes, and symbol $Q_2$ is a signal terminal which applies a reverse voltage across the opposed electrodes and positively discharges the stored charge. Incidentally, capacitors $C_1$, $C_2$, . . . , $C_{2048}$ simulate the liquid crystal layers corresponding to the optical switch portions.

Figure 6:
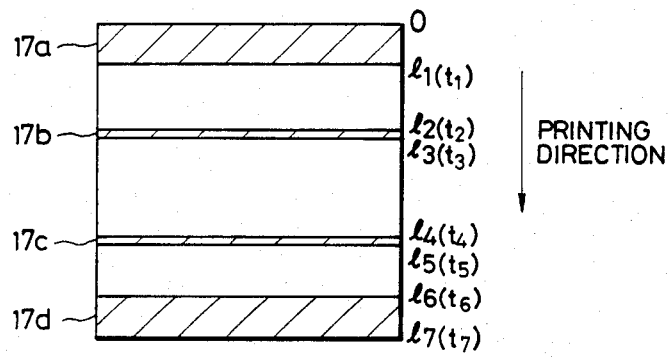
FIG. 6 is a schematic view useful for explaining the print state to paper by the printer.

FIG. 6 shows an example of the printed state of the paper. The zone represented by oblique lines in the drawing is a non-print zone, and zones 17a and 17d are leading and trailing end portions of the paper. Each zone is as wide as from 20 to 30 mm [with $l_1$ and $(l_7-l_6)$ representing the width]. On the other hand, zones 17b and 17c are those zones in which printing is not effected in several lines on the basis of line field instruction, and are by far narrower than the zones 17a and 17d. In the case of a line printer of a resolution of 10 dots/mm and a printing speed of 70 mm/sec (1,000 lines per minute), a line printing time is about 1.4 ms. Therefore, the time $t_1$ and $t_{67}$ ($=t_7-t_6$) necessary for passing through the zones 17a and 17d is from about 0.29 to about 0.43 seconds, and the time necessary for passing through the zones 17b and 17c is from several ms to some dozens of ms.

Figure 7:
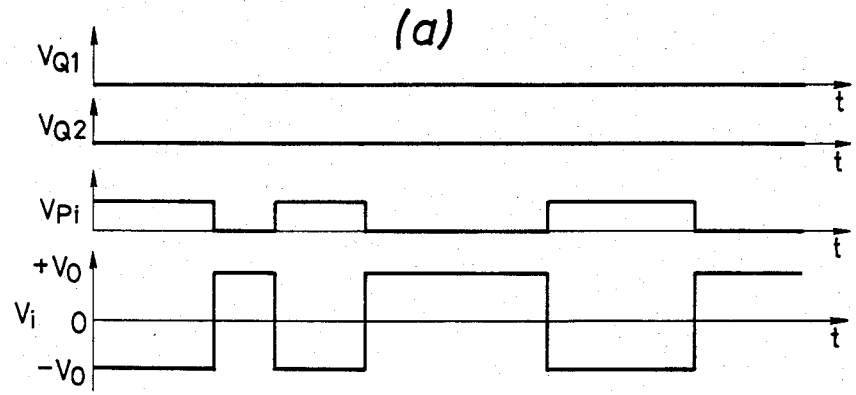
FIGS. 7a–e is a time chart showing the operation state of the driving circuit of FIG. 5.
Figure 7:
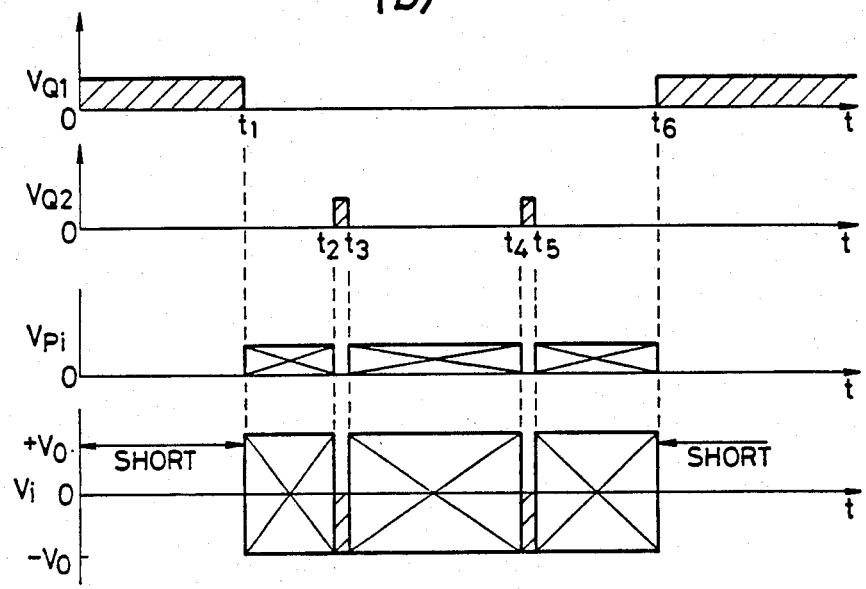
Figure 7:
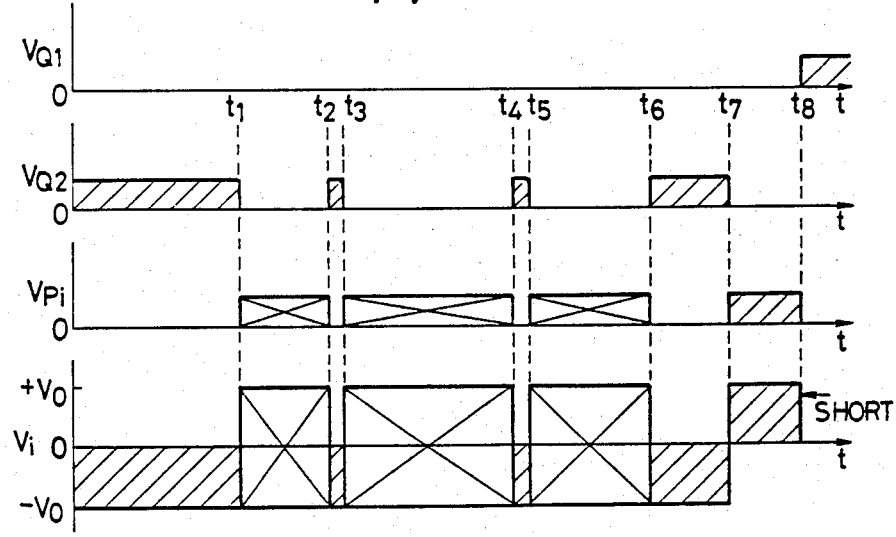
Figure 7:
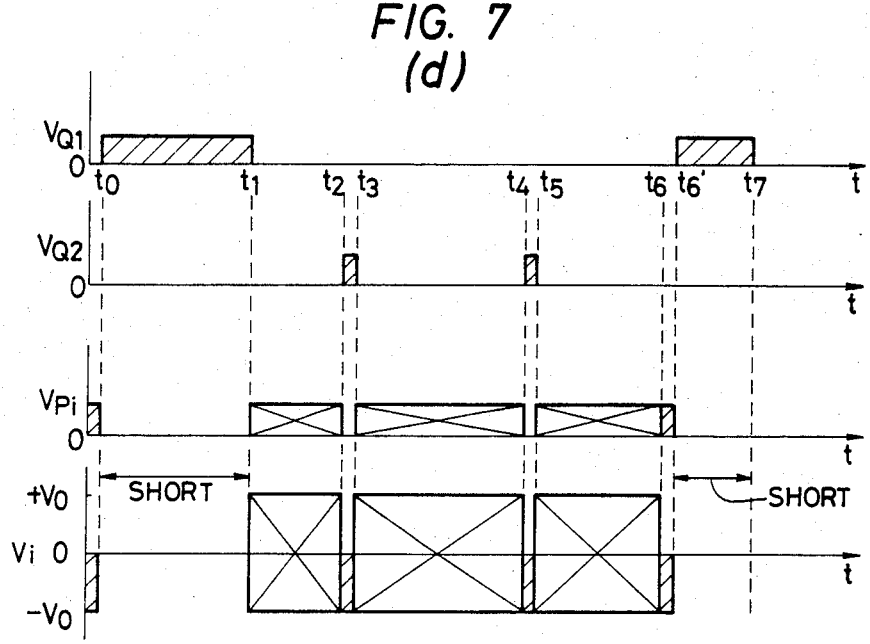
Figure 7:
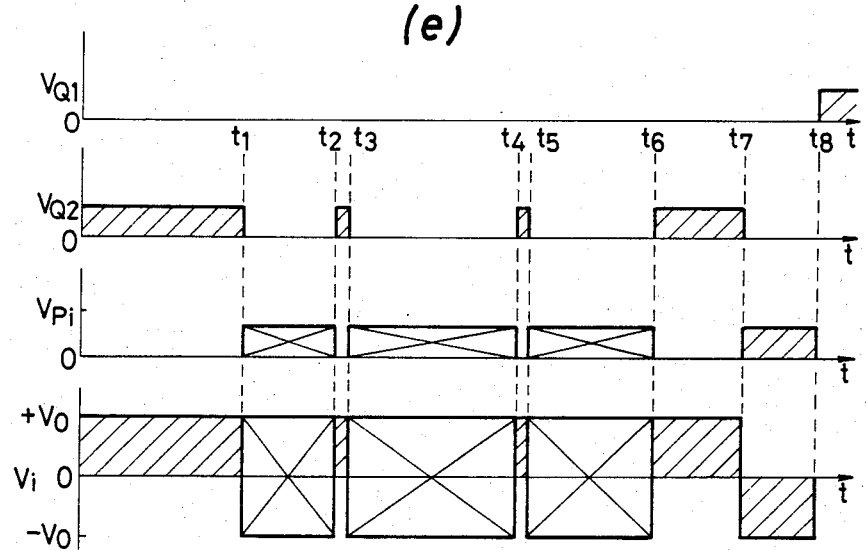

FIG. 7 is a diagram showing the operation state of the circuit shown in FIG. 5. Symbol $V_{pi}$ (i=1, 2, . . . , 2048) represents a voltage applied to the terminal $P_i$, and symbol $V_i$ represents a voltage applied to the liquid crystal layer $C_i$. The switches $S_A$ and $S_B$ are set to the terminal 2 to operate the optical switch array. When printing is to be effected, $V_{Q1}$ and $V_{Q2}$ are set to the L level as shown in FIG. 7(a). When the signal $V_{pi}$ entering the $P_i$ terminal is at the L level, a $-V_o$ voltage is applied to the liquid crystal layer, whereby the light is substantially cut off, and the light passes through. When an H level signal comes in, a $+V_o$ voltage is applied, whereby the light passes through. In this case, $V_o$ is set to 20 V, for example.

FIG. 7(b) is a diagram showing the driving state when the opposed electrodes are short-circuited and the driving state when the polarity is inverted, in order to print the state shown in FIG. 6. In FIG. 7(b), the light source 8 is not lit during the periods [0, $t_1$] and [$t_6$, $t_7$], and is lit during the period [$t_1$, $t_6$]. It is possible in such a case to dispose another optical switch means between the light source 8 and the optical switch array in order to cut off another optical switch means during the periods [0, $t_1$] and [$t_6$, $t_7$].

In FIG. 6, the opposed electrodes are short-circuited during the period [0, $t_1$] and [$t_6$, $t_7$] having a relatively long non-print time, and the polarity of the impressed voltage is inverted during the periods [$t_2$, $t_3$] and [$t_4$, $t_5$] having a relatively short non-print time, so that the voltage $-V_o$ is applied to the liquid crystal layer to cut off the light. To short-circuit the opposed electrodes, the opposed electrodes are short-circuited via a resistor $R_o$ and the ON resistance of transistors $TR_1$ and $TR_2$ when the $Q_1$ terminal is raised to the H level. The polarity of the impressed voltage can be inverted by setting the $Q_1$ terminal to the L level and the $Q_2$ terminal to the H level.

Since the periods [$t_1$, $t_2$], [$t_3$, $t_4$] and [$t_5$, $t_6$] are the printing period, the signal $V_{pi}$ is applied to the $P_i$ terminal in accordance with a desired print pattern, and the voltage $+V_o$ or $-V_o$ is applied to the respective liquid crystal layer $C_i$, thereby transmitting or cutting off the light. Thus, the desired print pattern is radiated onto the surface of the photosensitive drum 16. An example of the signals in these periods is shown in FIG. 7(a).

In FIG. 7(b), the high dielectric liquid crystal to be used may be either a liquid crystal assuming a completely bistable state or a liquid crystal not assuming a completely bistable state.

Figure 8:
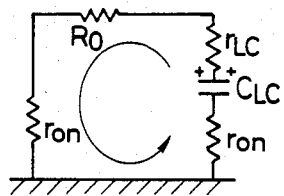
FIG. 8 is a circuit diagram showing an equivalent circuit when electrodes are short-circuited.

FIG. 8 shows an equivalent circuit when the opposed electrodes are short-circuited in FIG. 7(b). The capacitance $C_{LC}$ (internal capacitance) of the liquid crystal element is several thousands of PF while the resistance $r_{LC}$ is dozens of MΩ. On the other hand, $R_o$ is generally several KΩ and the ON resistance $r_{ON}$ of the transistors $TR_1$, $TR_2$ is several hundreds of ohms. Therefore, a complete short-circuit state is not attained, but $R_o$ and $r_{ON}$ are extremely smaller than the resistance $r_{LC}$ of the liquid crystal element, and hence a substantial short-circuit is attained.

FIG. 7(c) shows a driving voltage waveform when the state shown in FIG. 6 is to be printed in the case where the liquid crystal is a high dielectric liquid crystal which does not assume a complete bistable state, and the light source 8 is lit throughout the period [0, $t_n$]. The difference from FIG. 7(b) is that since the light source 8 is lit in the periods [0, $t_1$] and [$t_6$, $t_7$], too, and since the liquid crystal does not assume a completely bistable state, the voltage $-V_o$ is applied to the liquid crystal in order to completely cut off the light. Furthermore, among the periods after $t_7$ in which the light from the light source 8 is not incident, the voltage $+V_o$ is applied to the liquid crystal layer $C_i$ in the period [$t_7$, $t_8$] which is substantially equal to the period [$t_6$, $t_7$] to invert the polarity. After the stored charge is reduced, the opposed electrodes are short-circuited after the time $t_8$.

FIG. 7(d) shows a driving voltage waveform in the case where a liquid crystal used is a high dielectric liquid crystal assuming a completely bistable state and the light from the light source 8 is incident throughout the period [0, $t_7$]. The difference from FIG. 7(c) is that the voltage $-V_o$ is applied to the liquid crystal layer $C_i$ only the periods [0, $t_o$] and [$t_6$, $t_6'$] to cut off the light without applying the voltage $-V_o$ to the liquid crystal $C_i$ throughout the periods [0, $t_1$] and [$t_6$, $t_7$], and the opposed electrodes are short-circuited in the periods [$t_o$, $t_1$] and [$t_6'$, $t_7$] to keep the cutoff state of the light.

The embodiment of the present invention given above deals with an inversion development system, by way of example, in which the region of the photosensitive drum 16 to which the light is radiated is printed in black (printed), but a normal development system in which the region of the photosensitive drum to which the light is radiated becomes white (non-printed) can of course be employed in the present invention.

Figure 11:
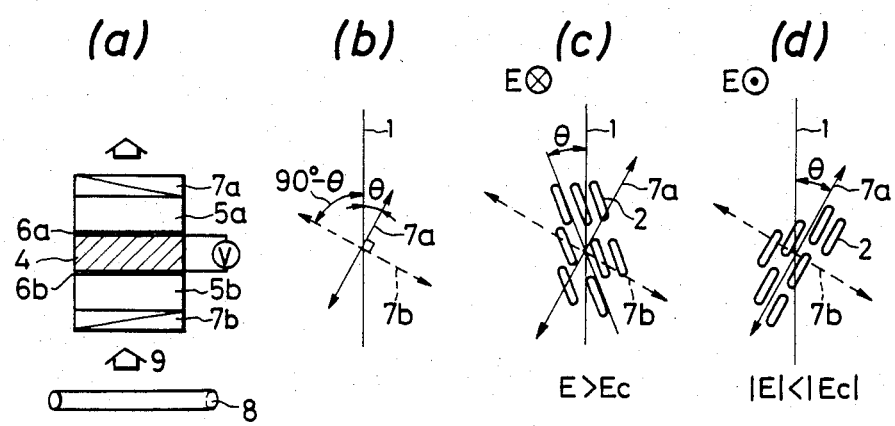
FIGS. 11a–d is a schematic view useful for explaining the operation mechanism of a birefringence type optical switch element.
Figure 12:
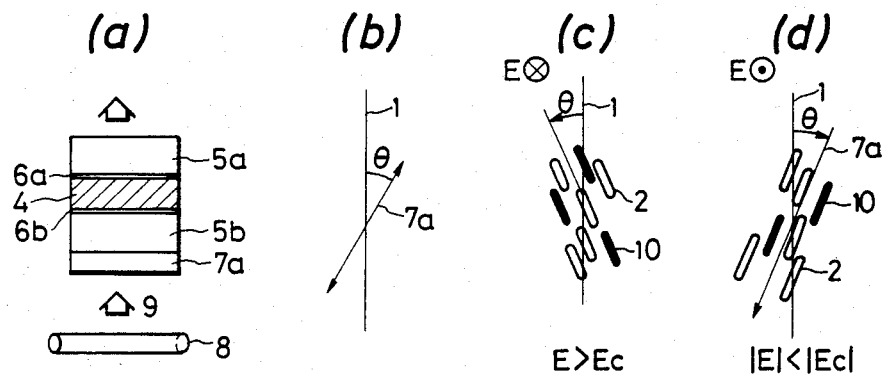
FIG. 12 shows the operating mechanism of a guest-/host optical switching element.
Figure 13:
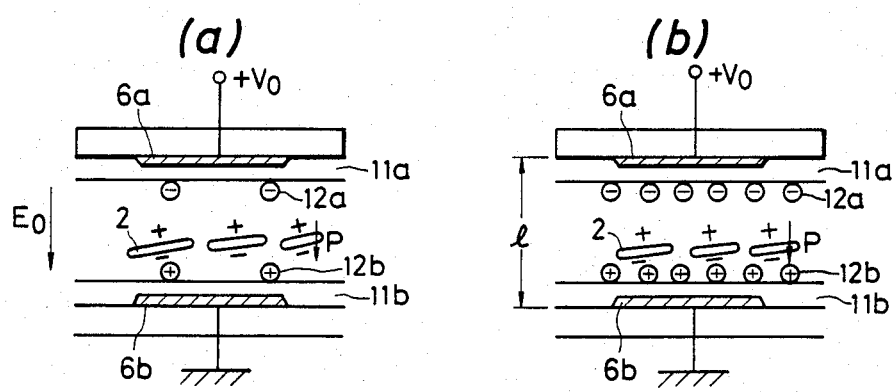
FIGS. 13a and b is a schematic view useful for explaining non-uniform existence of ions inside a liquid crystal layer due to the application of a d.c. voltage.
Figure 14:
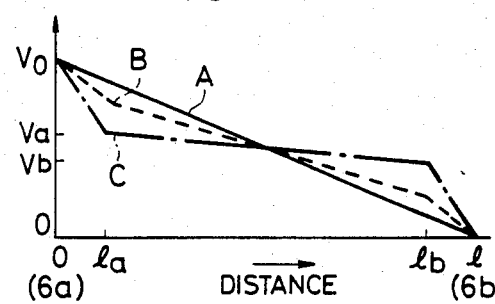
FIG. 14 is a characteristic diagram showing the change of potential distribution state inside an optical switch element due to the non-uniform existence of ions.
Figure 15:
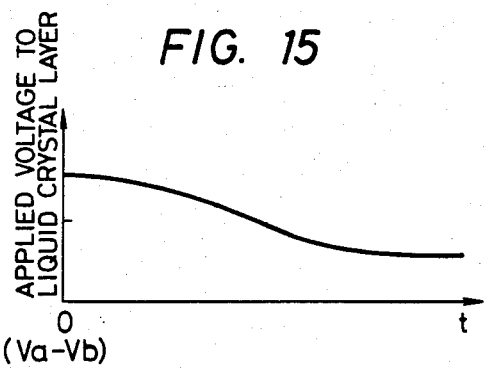
FIG. 15 is a characteristic diagram showing the change of a voltage shared by the liquid crystal layer.

In the foregoing embodiment, the light passes when the voltage $+V_o$ is applied to the liquid crystal layer and is cut off when the voltage $-V_o$ is applied thereto, due to the relation of position of the axes of polarization shown in FIGS. 11 and 12. However, the present invention can be applied also when this relation is opposite.

FIG. 7(e) shows an example of the driving voltage waveform corresponding to FIG. 7(c). In FIG. 7(e), the light is cut off when the voltage $+V_o$ is applied to the liquid crystal layer, and passes when the voltage $-V_o$ is applied thereto.

Figure 9:
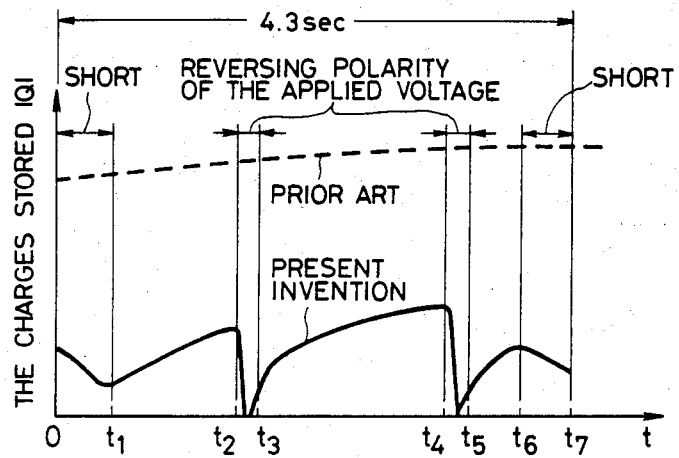
FIG. 9 is a schematic view useful for explaining the state of stored charge when mere short-circuiting is combined with polarity inversion.
Figure 10:
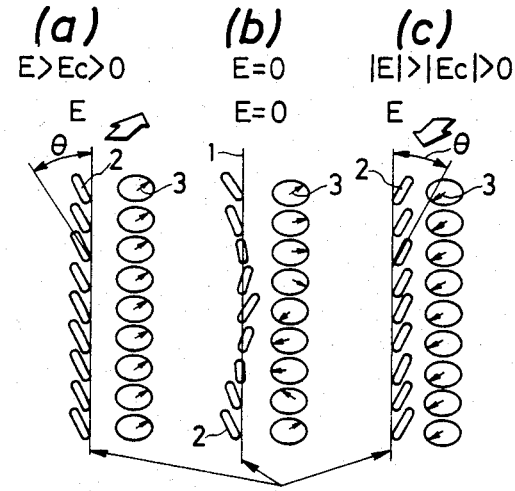
FIGS. 10a–c is a schematic view useful for explaining the field response of chiral smectic liquid crystal molecules.

FIG. 9 is a diagram showing the effect of the embodiment of the present invention, and showing also the change of the quantity of stored charge inside the element in the period in which one paper of A4 size is printed (about 4.3 seconds). In accordance with the prior art technique, the charge is always built up, but in accordance with the present invention, the quantity of the stored charge is remarkably reduced by short-circuit and by the application of a reverse voltage (by dozens percents). Therefore, it has been found that the present invention does not cause the problems of the prior art technique such as the drop of contrast due to the drop of the voltage shared by the liquid crystal layer, the dielectric breakdown due to the increase of the shared voltage of the orientation films, and the degradation of the liquid crystal due to the electrochemical reaction. Furthermore, when the printer (or the optical switch array) is out of operation, the stored charge in the element can be completed eliminated by connecting the switches $S_A$ and $S_B$ to the terminal 1 in FIG. 5. Though the operations for feeding the page of paper and for replacing the paper are not described, a further charge removing effect can of course be obtained by short-circuiting the opposed electrodes or applying a reverse voltage in accordance with the method shown in FIG. 7.

The quality of the print can be improved by preventing the light from the light source from being incident during the period in which the electrodes are short-circuited or discharge, in the printer operation, because such a period is a non-print period.

As described above, the driving method of the optical switch in accordance with the present invention can reduce or eliminate the stored charge at the portions close to the orientation films due to the application of a d.c. voltage, so that the non-uniform existence of ions can be minimized or be prevented, and eventually, the degradation of the performance of the optical switch element can be prevented.

What is claimed is:

1. A method for driving a plurality of optical switch elements of a liquid crystal device wherein each of the optical switch elements includes a transparent ferroelectric liquid crystal material between opposed electrodes, the method comprising the steps of applying a positive or negative voltage between the opposed electrodes of each of the plurality of optical switch elements selectively during a first period so as to control the quantity of transmission light between the opposed electrodes, and effecting a short circuit by simultaneously applying a substantially zero voltage between the opposed electrodes of all of the plurality of optical switch elements during a second period so as to reduce the quantity of non-uniform existence of ions in the high dielectric material between the opposed electrodes, wherein the second period is a period at least one of before and after the first period, and the second period is a shorter time than the first period and wherein the plurality of switch elements form part of a printer for printing a desired pattern on print regions of a paper having non-print regions, and the second period wherein the substantially zero voltage is applied simultaneously between opposed electrodes of all of the plurality of optical switch elements corresponds to at least one of the non-print regions at the leading and trailing end portions of the paper among the nonprint regions of the paper.

2. A method according to claim 1, wherein the second period is provided both before and after the first period.

* * * * *